(12) United States Patent
Lee et al.

(10) Patent No.: US 8,488,924 B2
(45) Date of Patent: Jul. 16, 2013

(54) OPTICAL WAVEGUIDE AND BI-DIRECTIONAL OPTICAL TRANSCEIVER

(75) Inventors: Sei-Hyoung Lee, Gwangju-si (KR); Hyun-Seo Kang, Gwangju-si (KR); Jai-Sang Koh, Gwangju-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 576 days.

(21) Appl. No.: 12/828,761

(22) Filed: Jul. 1, 2010

(65) Prior Publication Data
US 2011/0002692 A1 Jan. 6, 2011

(30) Foreign Application Priority Data

Jul. 3, 2009 (KR) .................. 10-2009-0060847
Oct. 20, 2009 (KR) .................. 10-2009-0099815

(51) Int. Cl.
*G02B 6/42* (2006.01)
*G02B 6/26* (2006.01)
*H04B 10/12* (2006.01)
*H04B 10/24* (2006.01)

(52) U.S. Cl.
USPC .............. 385/31; 385/28; 385/37; 385/88; 398/139

(58) Field of Classification Search
USPC ........................... 385/28; 398/139
See application file for complete search history.

(56) References Cited

U.S. PATENT DOCUMENTS

| 5,859,944 | A | 1/1999 | Inoue et al. | |
| 6,314,222 | B1 | 11/2001 | Jang et al. | |
| 6,722,793 | B2 | 4/2004 | Althaus et al. | |
| 6,869,229 | B2 | 3/2005 | Reedy et al. | |
| 7,373,050 | B2 | 5/2008 | Nagashima | |
| 7,526,156 | B2 * | 4/2009 | Lee et al. | 385/31 |
| 7,720,332 | B2 | 5/2010 | Park et al. | |
| 7,792,401 | B2 * | 9/2010 | Kang et al. | 385/31 |
| 7,995,883 | B2 * | 8/2011 | Lee et al. | 385/39 |
| 2002/0021872 | A1 * | 2/2002 | Althaus et al. | 385/88 |
| 2004/0042726 | A1 | 3/2004 | Kersey et al. | |
| 2004/0240797 | A1 * | 12/2004 | Nagashima | 385/88 |
| 2005/0185885 | A1 * | 8/2005 | Onaka et al. | 385/24 |
| 2007/0104426 | A1 * | 5/2007 | Yun et al. | 385/88 |
| 2008/0089644 | A1 * | 4/2008 | Lee et al. | 385/33 |
| 2008/0252961 | A1 * | 10/2008 | Mesaki et al. | 359/281 |
| 2010/0021108 | A1 * | 1/2010 | Kang et al. | 385/16 |
| 2010/0135614 | A1 * | 6/2010 | Lee et al. | 385/31 |

FOREIGN PATENT DOCUMENTS

| JP | 8-54541 | 2/1996 |
| JP | 9-145927 | 6/1997 |
| JP | 2008-107760 | 5/2008 |
| KR | 10-0261308 | 4/2000 |
| KR | 10-0334801 | 4/2002 |
| KR | 10-2004-0033997 | 4/2004 |
| KR | 10-2006-0065430 | 6/2006 |

\* cited by examiner

*Primary Examiner* — Michelle R Connelly
(74) *Attorney, Agent, or Firm* — Staas & Halsey LLP

(57) ABSTRACT

An optical waveguide and a bi-directional transceiver are provided. A single mode optical fiber has one end coupled to one end of a hollow optical fiber and an opposite end having a slope plane, thereby separating optical signals travelling in opposite directions from each other. Manual alignment for an optical system is easily realized without the need for additional optical elements, so that the light transmission/reception performance of the optical waveguide is improved and the structure of the optical waveguide is smaller.

18 Claims, 7 Drawing Sheets

OPTICAL WAVEGUIDE AND BI-DIRECTIONAL OPTICAL TRANSCEIVER

CROSS-REFERENCE TO RELATED APPLICATION

This application claims the benefit under 35 U.S.C. §119 (a) of Korean Patent Application No. 10-2009-0060847, filed on Jul. 3, 2009 and No. 10-2009-0099815, Oct. 20, 2009, the disclosures of which are incorporated by reference in their entirety for all purposes.

BACKGROUND

1. Field

The following description relates to an optical transmission technology, and more particularly, to an optical waveguide and a bi-directional optical transceiver.

2. Description of the Related Art

FIG. 1 shows a conventional bi-directional optical transceiver, which achieves bi-directional optical communication using a single optical waveguide, for example one single optical fiber. The conventional bi-directional optical transceiver separates optical signals travelling in opposite directions from each other by use of a free space optical system including an optical waveguide 10, a light output unit 30, a light detection unit 40 and an external filter 20 installed among the optical waveguide 10, the light output unit 30 and the light detection unit 40, thereby achieving bidirectional optical communication. However, according to the above structure, the performance of the optical transceiver is highly dependant on the position of components of the optical transceiver.

In particular, the optical system needs to be manually aligned such that transmission signals output from the light output unit 30 pass through a core 11 having a very small diameter. However, the use of the external filter causes a difficulty in aligning the optical system and as a consequence makes it difficult to realize a compact sized bi-directional optical transceiver.

In this regard, a study has been pursued to provide an optical waveguide and an optical transceiver, capable of achieving smaller size and superior transmit/reception performance of light through easier manual alignment of optical system.

SUMMARY

Accordingly, in one aspect, there is provided an optical waveguide and an optical transceiver, which can be easily miniaturized and effectively transmit and receive light by easier manual alignment for optical components.

In one general aspect, there is provided an optical waveguide. The optical waveguide includes a single mode optical fiber and a hollow optical fiber. The single mode optical fiber has a core that is equipped with a wavelength selective filter to separate optical signals travelling in opposite directions from each other. The hollow optical fiber has one end coupled to one end is of the single mode optical fiber and an opposite end having a slope plane.

In another general aspect, there is provided an optical waveguide. The optical waveguide includes a single mode optical fiber and a hollow optical fiber. The single mode optical fiber has a core, a cross section of which has a slope plane symmetric around a central axis of the core. The hollow optical fiber has one end coupled to one end of the single mode optical fiber and an opposite end which has a slope plane.

In another general aspect, there is provided a bi-directional optical transceiver including an optical waveguide. The optical waveguide includes a single mode optical fiber having a core that is equipped with a wavelength selective filter to separate signals travelling in opposite directions from each other, and a hollow optical fiber, which has one end coupled to one end of the single mode optical fiber and an opposite end having a slope plane.

In another general aspect, there is provided a bi-directional optical transceiver including an optical waveguide. The optical waveguide includes a single mode optical fiber having a core, a cross section of which has a slope plane symmetric around a central axis of the core, and a hollow optical fiber, which has one end coupled to one end of the single mode optical fiber and an opposite end having a slope plane.

As apparent through above, one end of a single mode optical fiber is coupled to one end of a hollow optical fiber and an opposite end of the hollow optical fiber is angled, thereby allowing transmission/reception optical signals travelling in opposite directions to be separated. Accordingly, manual alignment for an optical system is easily realized without the need for additional optical elements, so that the light transmission/reception performance of the optical waveguide is improved and the structure of the optical waveguide is smaller.

Other objects, features and advantages will be apparent from the following description, the drawings, and the claims.

BRIEF DESCRIPTION OF THE DRAWINGS

Elements, features, and structures are denoted by the same reference numerals throughout the drawings and the detailed description, and the size and proportions of some elements may be exaggerated in the drawings for clarity and convenience.

DETAILED DESCRIPTION

The following detailed description is provided to assist the reader in gaining a comprehensive understanding of the methods, apparatuses and/or systems described herein. Various changes, modifications, and equivalents of the systems, apparatuses and/or methods described herein will suggest themselves to those of ordinary skill in the art. Descriptions of well-known functions and structures are omitted to enhance clarity and conciseness.

In the following description, a detailed description of known functions and configurations incorporated herein will be omitted when it may obscure the subject matter with unnecessary detail.

Before describing the exemplary embodiments, terms used throughout this specification are defined. These terms are defined in consideration of functions according to exemplary embodiments, and can be varied according to the purpose of a user or manager, or a relevant standard and so on. Therefore, definitions of the terms should be made on the basis of the overall context.

An optical waveguide refers to a transmission path such as optical fibers for transmitting optical signals.

A bi-directional optical transceiver is a device capable of transmitting and receiving is optical signals using a single optical waveguide.

A cladding mode refers to a section of optical signals being transferred inside a cladding.

A core mode refers to a section of optical signals being transferred inside a core.

Figure 1:
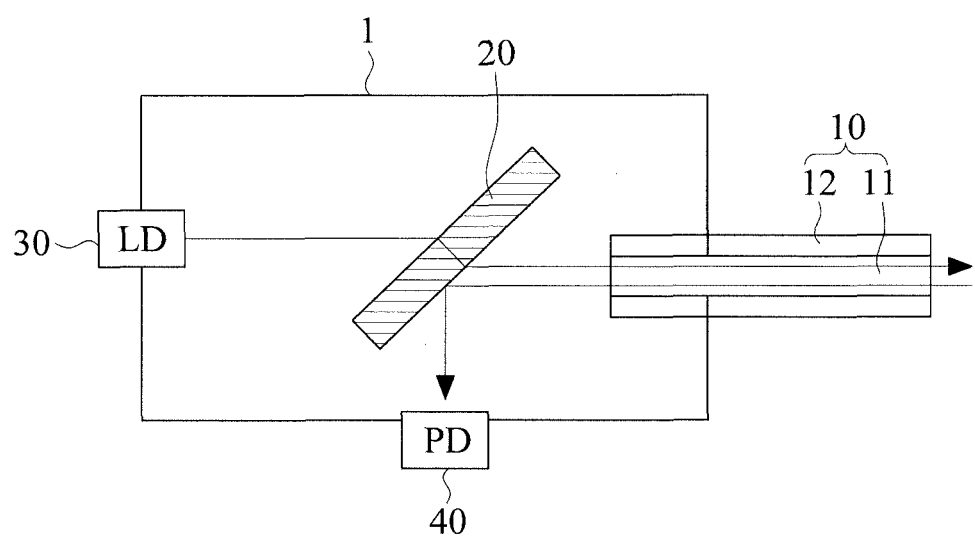
FIG. 1 is a view showing a conventional bi-directional optical transceiver.
Figure 2:
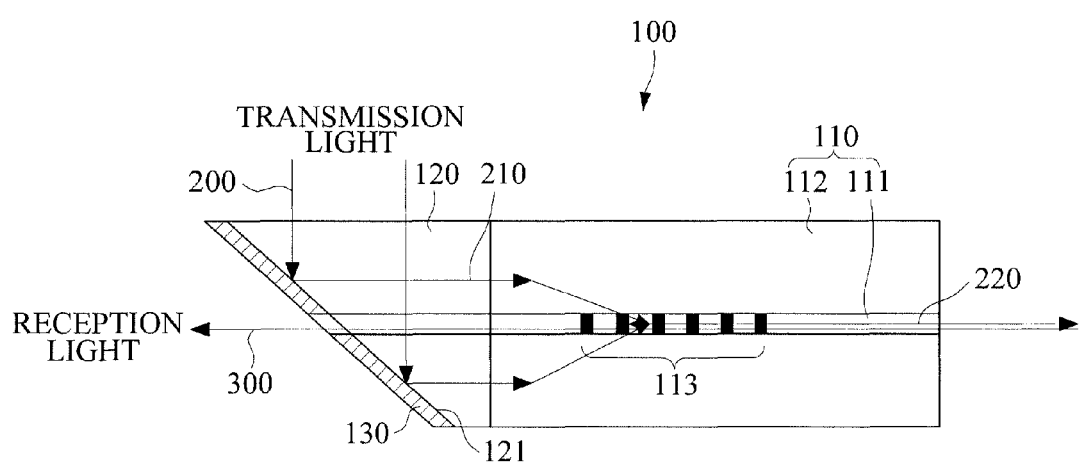
FIGS. 2 to 4 are views showing examples of an optical waveguide.
Figure 3:
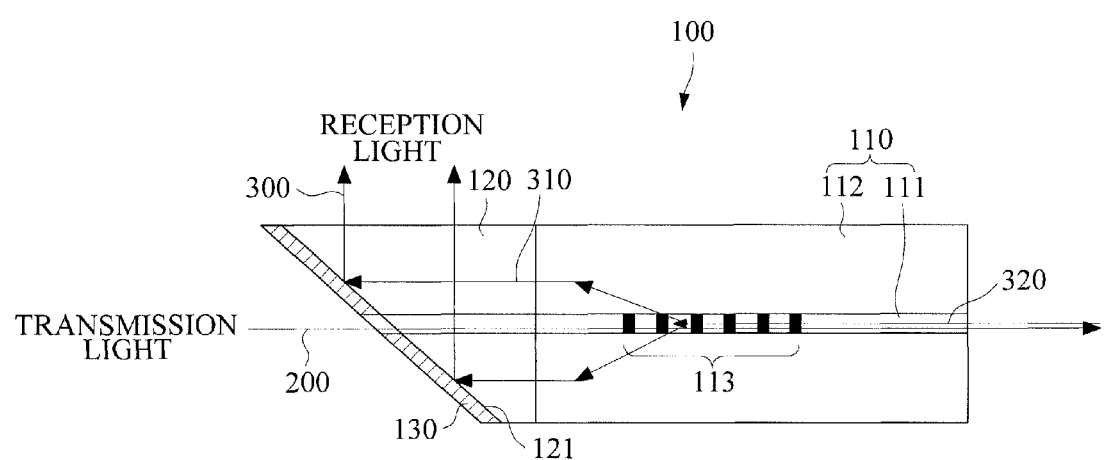

FIGS. 2 and 3 are views showing examples of an optical waveguide. In FIGS. 2 and 3, the positions of a light output unit and a light detection unit are exchanged. As shown in FIGS. 2 and 3, an optical waveguide 100 includes a single mode optical fiber 110 and a hollow optical fiber 120.

The single mode optical fiber 110 includes a core 111, a cladding 112 and a wavelength selective filter 113. The core 111 is used to convey light. The cladding 112 surrounds the core 111 and confines light inside the core 111 through total internal reflection.

The wavelength selective filter 113 is accommodated in the core 111 to separate optical signals travelling in opposite directions from each other. For example, the wavelength selective filter 113 may be a long period grating (LPG) filter.

As shown in FIG. 2, the wavelength selective filter 113 may convert transmission light of a cladding mode 210 travelling along the cladding 112 into light of a core mode 220. Alternatively, as shown in FIG. 3, the wavelength selective filter 113 may convert light of a core mode 320 travelling along the core 111 into light of a cladding mode 310.

Meanwhile, light travelling in the opposite direction to the light which is to be converted by the wavelength selective filter 113 passes through the wavelength selective filter 113 without being converted.

The hollow optical fiber 120 has one end coupled to one end of the single mode optical fiber 110 and an opposite end having a slope plane 121. For example, one end of the single mode optical fiber 110 may be coupled to one end of the hollow optical fiber 120 through fusion.

Meanwhile, the coupled one ends of the single mode optical fiber 110 and the hollow optical fiber 120 have a perpendicular cross section. The core of the single mode optical fiber 110 has a diameter equal to that of a hollow portion of the hollow optical fiber 120.

As shown in FIG. 2, if transmission light is incident perpendicular to the extension direction of the optical waveguide 110, the transmission light is reflected at the slope plane 121 of the hollow optical fiber 120 and is therefore converted into light of a cladding mode 210. Meanwhile, as shown in FIG. 3, light of a core mode 320 is converted into light of a cladding mode 310 by the wavelength selective filter 113, and then is reflected perpendicular to the extension direction of the optical waveguide 100 at the slope plane 121 of the hollow optical fiber 120.

As described above, the slope plane 121 of the hollow optical fiber 120 changes the path of transmission light or reception light, thereby achieving the bi-directional transmission in the optical waveguide 100. In the conventional optical waveguide, light needs to be directly input into a core having a small diameter and this complicates manual alignment of the optical system. However, according to the present invention, even if light is input into the cladding 112, which has a relatively large diameter, the light is effectively transmitted along the optical waveguide 100. That is, the alignment margin for the optical system is large and thus manual alignment for the optical system is easily facilitated.

According to another example, the optical waveguide 100 may further include a mirror 130 coupled to the opposite end of the hollow optical fiber.

The minor 130 is installed on the slope plane 121 of the hollow optical fiber 120 so that transmission light 200 or reception light 300 can be reflected regardless of total internal reflection conditions, thereby enhancing the efficiency of the cladding mode.

Figure 4:
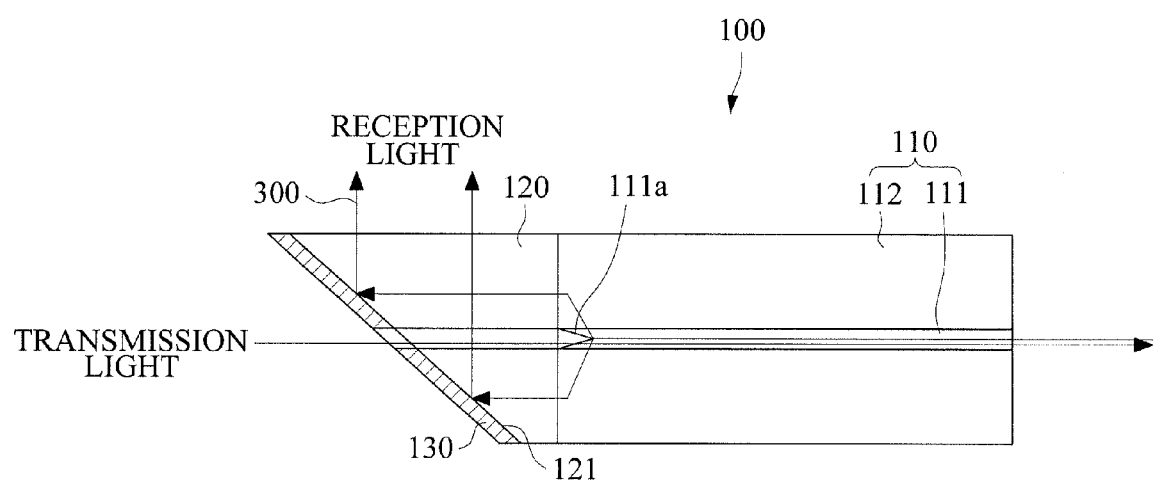

Different from FIGS. 2 and 3, an optical waveguide according to another example does not have the wavelength selective filter, and instead, as shown in FIG. 4, the optical waveguide has a core, a cross section of which has a slope plane 111a symmetric around the central axis of is the core.

As shown in FIG. 4, the reception light is converted into light of a cladding mode at the slope plane 111a of the cross section of the core 111, which is symmetric around the central axis of the core 111 regardless of wavelength. Accordingly, there is no need for the wavelength selective filter 113, so the optical waveguide 100 is simpler and smaller. In this example shown in FIG. 4, details of elements identical to those of the previous example shown in FIGS. 2 and 3 will be omitted in order to avoid redundancy.

Figure 5:
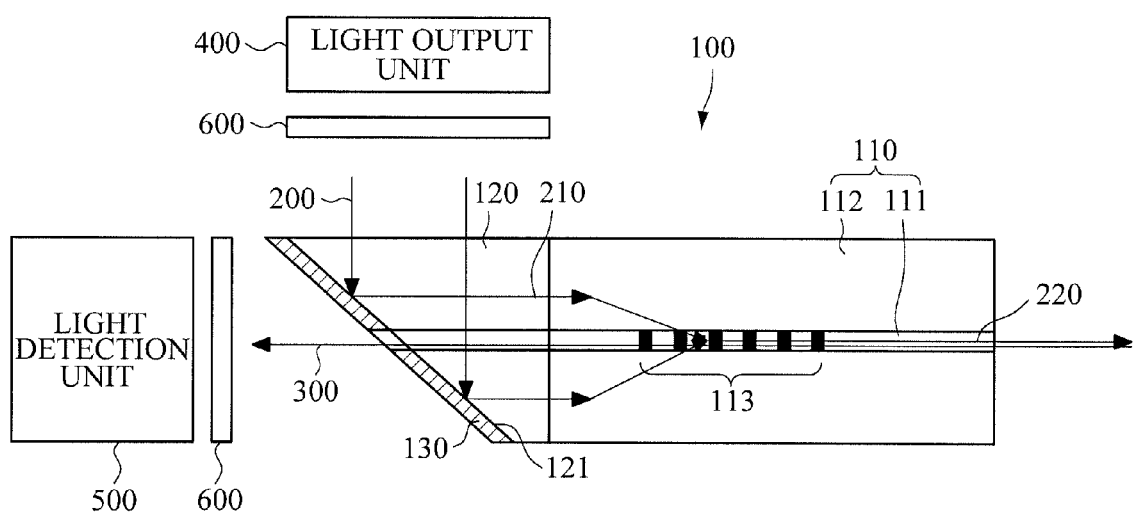
FIGS. 5 to 7 are sectional views showing examples of a bidirectional optical transceiver.
Figure 6:
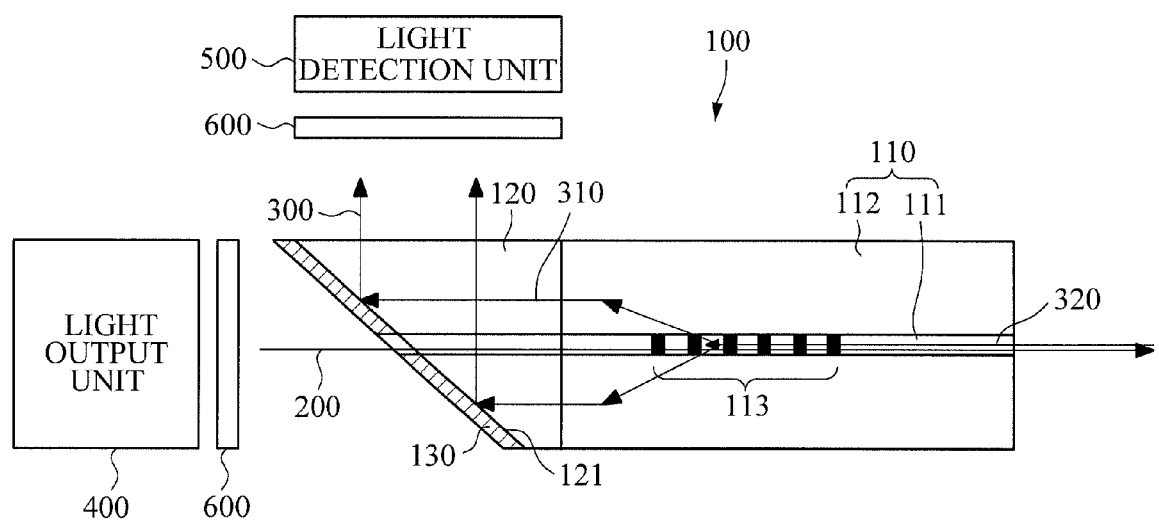

Hereinafter, a bi-directional transceiver having the above optical waveguide will be described with reference to FIGS. 5 to 7. FIG. 5 is a schematic view showing one example of a bidirectional optical transceiver. FIG. 6 is a schematic view showing another example of a bidirectional optical transceiver. As shown in FIGS. 5 and 6, the bi-directional optical transceiver includes an optical waveguide 100, a light output unit 400 and a light detection unit 500. In FIGS. 5 and 6, the positions of the optical generation unit 400 and the optical detection unit 500 are exchanged.

The optical waveguide 100 includes a single mode optical fiber 110 having a core that is equipped with a wavelength selective filter 113 to separate signals travelling in opposite directions from each other, and a hollow optical fiber 120, which has one end coupled to one end of the single mode optical fiber and an opposite end having a slope plane 121. The optical waveguide 100 has been described above with reference to FIGS. 2 and 3, and as such a detailed description thereof will be omitted.

The light output unit 400 is configured to output light to the optical waveguide 100. For example, the light output unit 400 converts transmission signals in the form of electrical signals into optical signals by use of a laser diode (LD) and then outputs the optical signals to the optical waveguide 100.

The light detection unit 500 is configured to detect light transmitted by the optical waveguide 100. For example, the light detection unit 500 converts the optical signals transmitted along the optical waveguide 100 into electrical signals by use of a photodiode (PD) such that signals in the form of electrical signal are received.

According to the present example, transmission light 200 output from the light output unit 400 is converted into light of the cladding mode 210 by the slope plane 121 of the hollow optical fiber 120 and propagates through the cladding 112 of the single mode optical fiber, and is then converted into light of a core mode 220 by the wavelength selective filter 113.

Meanwhile, as shown in FIG. 6, reception light 300 of a core mode 320 that is received through the core 111 of the signal mode optical fiber 110 is converted into light of a cladding mode 310 by the wavelength selective filter 113, passes through the cladding 112 of the single mode optical fiber 110, and is then reflected at the slope plane 121 of the hollow optical fiber 120. Subsequently, the reflected light is detected by the light detection unit 500.

Meanwhile, light travelling in the opposite direction to the light to be converted by the wavelength selective filter 113 passes through the wavelength selective filter 113 without being converted.

As describe above, according to the example of the bi-direction optical transceiver, the paths of transmission light and reception light are changed by use of the slope plane 121 of the hollow optical fiber 120 of the optical waveguide 100, thereby achieving bi-directional transmission.

In addition, in the conventional optical waveguide, light needs to be directly input into a core having a small diameter and this complicates the manual alignment of the optical system. However, according to the present invention, the transmission light and reception light are transmitted through the cladding 112 having a diameter larger than that of the core 111 of the single mode optical fiber 110, so that the alignment margin for the optical system is large and is thus manual alignment for the optical system is easily facilitated.

Figure 7:
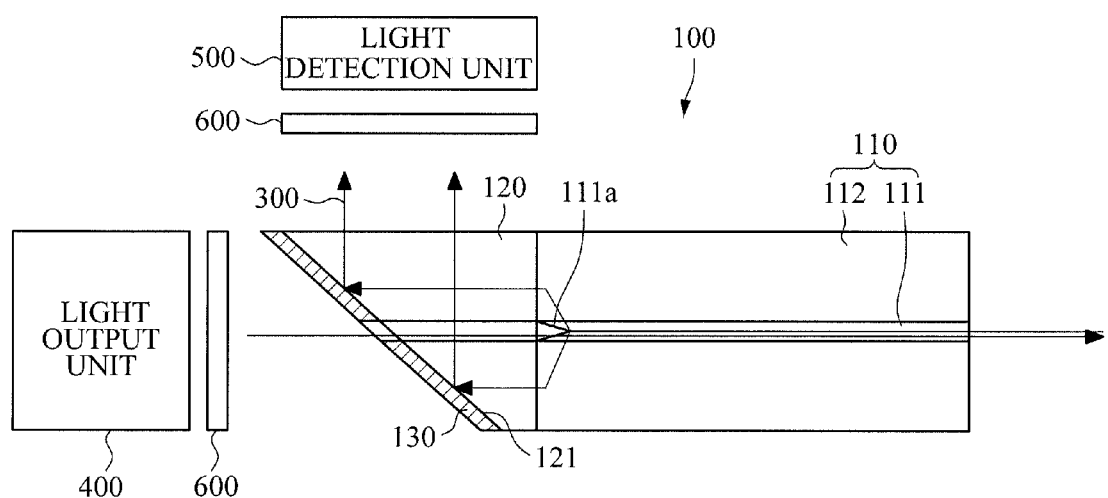

FIG. 7 is a schematic view showing another example of a bi-directional optical transceiver. As shown in FIG. 7, the bi-directional optical transceiver includes an optical waveguide 100, an optical output unit 400 and an optical detection unit 500.

The optical waveguide 100 includes a single mode optical fiber 110 having a core 111, a cross section of which has a slope plane 111a symmetric around a central axis of the core 111, and a hollow optical fiber 120, which has one end coupled to one end of the single mode optical fiber and an opposite end which has a slope plane. The configuration of the optical waveguide 100 has been described above with reference to FIG. 4, and as such a detailed description will be omitted.

The light output unit 400 is configured to output light to the optical waveguide 100. For example, the light output unit 400 converts transmission signals in the form of electrical signals into optical signals by use of a laser diode (LD) and then outputs the optical signals to the optical waveguide 100.

The light detection unit 500 is configured to detect light transmitted by the optical waveguide 100. For example, the light detection unit 500 converts the optical signals transmitted along the optical waveguide 100 into electrical signals by use of a photodiode (PD) such that reception signals in the form of electrical signals are received.

According to the present example, transmission light output from the light output unit 400 passes through the hollow portion of the hollow optical fiber 120, and is then transmitted in the form of a core mode along the core 111 of the single mode optical fiber 110. The light received through the core 111 of the single mode optical fiber 110 is converted into light of a cladding mode by the slope plane 111a of the cross section of the core 111 regardless of wavelength, in which the slope plane 111a is symmetric around the central axis of the core 111. The light converted into a cladding mode passes through a cladding 112 of the single mode optical fiber 110 and is then reflected by a slope plane 121 of the hollow optical fiber 120. The light reflected by the slope plane 121 is received and detected by the light detection unit 500.

According to the example, the bi-directional optical transceiver does not require the wavelength selective filter 113, which is provided in the bi-directional optical transceiver shown in FIGS. 5 and 6, so that the structure of the optical waveguide 100 is simpler and smaller.

Meanwhile, another example of a bi-directional optical transceiver may further include a lens 600. The lens 600 may be installed between the optical waveguide 100 and the light output unit 400, or between the optical waveguide 100 and the light detection unit 500, thereby enhancing the efficiency of photocoupling.

As described above, one end of the single mode optical fiber is coupled to one end of the hollow optical fiber and an opposite end of the hollow optical fiber has a slope plane, thereby allowing transmission/reception optical signals travelling in opposite directions to be separated. Accordingly, manual alignment for an optical system is easily realized without the need for additional optical elements, so that the light transmission/reception performance of the optical waveguide is improved and the structure of the optical waveguide and the bi-directional transceiver is smaller.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An optical waveguide comprising:
   a single mode optical fiber having a core that is equipped with a wavelength selective filter to separate signals travelling in opposite directions from each other; and
   a hollow optical fiber, which has one end coupled to one end of the single mode optical fiber and an opposite end which has a slope plane.

2. The optical waveguide of claim 1, wherein the one end of the single mode optical fiber is coupled to the one end of the hollow optical fiber through fusion.

3. The optical waveguide of claim 1, wherein the coupled one ends of the single mode optical fiber and the hollow optical fiber have a perpendicular cross section.

4. The optical waveguide of claim 1, wherein the core of the single mode optical fiber has a diameter equal to a diameter of a hollow portion of the hollow optical fiber.

5. The optical waveguide of claim 1, wherein the wavelength selective filter is a long period grating filter.

6. The optical waveguide of claim 1, further comprising a minor coupled to the opposite end of the hollow optical fiber.

7. An optical waveguide comprising:
   a single mode optical fiber having a core, a cross section of which has a slope plane symmetric around a central axis of the core; and
   a hollow optical fiber, which has one end coupled to one end of the single mode optical fiber and an opposite end which has a slope plane.

8. A bi-directional optical transceiver comprising:
   an optical waveguide including a single mode optical fiber having a core that is equipped with a wavelength selective filter to separate signals travelling in opposite directions from each other, and a hollow optical fiber, which has one end coupled to one end of the single mode optical fiber and an opposite end which has a slope plane;
   a light output unit to output light to the optical waveguide; and
   a light detection unit to detect light transmitted by the optical waveguide.

9. The bi-directional optical transceiver of claim 8, wherein the one end of the is single mode optical fiber is coupled to the one end of the hollow optical fiber through fusion.

10. The bi-directional optical transceiver of claim 8, wherein the coupled one ends of the single mode optical fiber and the hollow optical fiber have a perpendicular cross section.

11. The bi-directional optical transceiver of claim 8, wherein the core of the single mode optical fiber has a diameter equal to a diameter of a hollow portion of the hollow optical fiber.

12. The bi-directional optical transceiver of claim 8, wherein the wavelength selective filter is a long period grating filter.

13. The bi-directional optical transceiver of claim 8, wherein the light output unit is a laser diode.

14. The bi-directional optical transceiver of claim 8, wherein the light detection unit is a photodiode.

15. The bi-directional optical transceiver of claim 8, further comprising a mirror coupled to the opposite end of the hollow optical fiber.

16. The bi-directional optical transceiver of claim 8, further comprising a lens provided between the optical waveguide and the light output unit.

17. The bi-directional optical transceiver of claim 8, further comprising a lens is provided between the optical waveguide and the light detection unit.

18. A bi-directional optical transceiver comprising:
an optical waveguide including a single mode optical fiber having a core, a cross section of which has a slope plane symmetric around a central axis of the core, and a hollow optical fiber, which has one end coupled to one end of the single mode optical fiber and an opposite end which has a slope plane;
a light output unit to output light to the optical waveguide; and
a light detection unit to detect light transmitted by the optical waveguide.

* * * * *